United States Patent
Noh et al.

(10) Patent No.: US 9,572,048 B2
(45) Date of Patent: Feb. 14, 2017

(54) COMMUNICATION METHOD AND APPARATUS FOR DEVICE-TO-DEVICE (D2D)

(71) Applicant: Samsung Electronics Co., Ltd., Suwon-si (KR)

(72) Inventors: Won Jong Noh, Seoul (KR); Won Jae Shin, Seoul (KR); Jong Bu Lim, Yongin-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 14/341,365

(22) Filed: Jul. 25, 2014

(65) Prior Publication Data

US 2015/0043385 A1 Feb. 12, 2015

(30) Foreign Application Priority Data

Aug. 8, 2013 (KR) .................. 10-2013-0094114

(51) Int. Cl.
*H04W 24/02* (2009.01)
*H04W 72/04* (2009.01)
*H04W 76/02* (2009.01)
*H04W 84/18* (2009.01)
(Continued)

(52) U.S. Cl.
CPC .......... *H04W 24/02* (2013.01); *H04W 72/048* (2013.01); *H04W 76/023* (2013.01); *H04W 40/24* (2013.01); *H04W 84/18* (2013.01); *H04W 92/18* (2013.01)

(58) Field of Classification Search
None
See application file for complete search history.

(56) References Cited

U.S. PATENT DOCUMENTS

2011/0103240 A1    5/2011    Taghavi Nasrabadi et al.
2011/0103319 A1    5/2011    Abraham et al.
(Continued)

FOREIGN PATENT DOCUMENTS

JP    2010-239417 A    10/2010
JP    2012-195920 A    10/2012
(Continued)

OTHER PUBLICATIONS

Extended European Search Report issued on Jan. 26, 2015 in counterpart European Application No. 14177359.8 (8 pages, in English).
(Continued)

*Primary Examiner* — Kodzovi Acolatse
(74) *Attorney, Agent, or Firm* — NSIP Law

(57) ABSTRACT

Provided are a communication method and apparatus for device-to-device (D2D). More particularly, the communication method for D2D includes configuring a network topology using at least one cooperating base station to communicate among devices included in multiple heterogeneous cells, creating an association between multiple device pairs and at least one base station based on configuring the network topology, and determining a cooperation context for communication among the multiple device pairs is provided. The communication apparatus carries out such a method.

25 Claims, 10 Drawing Sheets

(51) Int. Cl.
*H04W 92/18* (2009.01)
*H04W 40/24* (2009.01)

(56) References Cited

U.S. PATENT DOCUMENTS

| | | | | |
|---|---|---|---|---|
| 2011/0275382 | A1* | 11/2011 | Hakola | H04W 24/10 455/452.2 |
| 2012/0064935 | A1* | 3/2012 | Hakola | H04W 72/02 455/513 |
| 2012/0163235 | A1 | 6/2012 | Ho et al. | |
| 2013/0029680 | A1 | 1/2013 | Park et al. | |
| 2013/0308490 | A1* | 11/2013 | Lim | H04B 7/026 370/252 |
| 2014/0169232 | A1* | 6/2014 | Aggarwal | H04L 5/14 370/277 |
| 2014/0274066 | A1* | 9/2014 | Fodor | H04W 36/08 455/437 |
| 2015/0282231 | A1* | 10/2015 | Gunnarsson | H04L 5/14 370/329 |

FOREIGN PATENT DOCUMENTS

| | | |
|---|---|---|
| KR | 10-2009-0005601 A | 1/2009 |
| KR | 10-2010-0082287 A | 7/2010 |
| KR | 10-2011-0051133 A | 5/2011 |
| KR | 10-2012-0059989 A | 6/2012 |
| KR | 10-2013-0004926 A | 1/2013 |
| KR | 10-2013-0019426 A | 2/2013 |
| WO | WO 2012/015698 A1 | 2/2012 |
| WO | WO 2012/162890 A1 | 6/2012 |

OTHER PUBLICATIONS

Lee, Donghoon, et al. "Performance of multihop decode-and-forward relaying assisted device-to-device communication underlaying cellular networks." *Information Theory and its Applications (ISITA), 2012 International Symposium on.* IEEE, 2012. (6 pages, in English).

* cited by examiner

COMMUNICATION METHOD AND APPARATUS FOR DEVICE-TO-DEVICE (D2D)

CROSS-REFERENCE TO RELATED APPLICATION

This application claims the benefit under 35 U.S.C. §119 (a) of Korean Patent Application No. 10-2013-0094114 filed on Aug. 8, 2013, in the Korean Intellectual Property Office, the entire disclosure of which is incorporated herein by reference for all purposes.

BACKGROUND

1. Field

The following description relates to a communication method and apparatus for device-to-device (D2D).

2. Description of Related Art

Due to a sharp increase in the number and variety of communication devices such as smart devices, sensor devices, and similar devices, the amount of communication traffic using such devices is simultaneously undergoing an exponential increase. However, the ability of frequency and spectrum resources currently available for wireless communications by such devices is reaching its limits. As such, as frequency resources are allocated to handle an ever increasing amount of communication traffic, the available communications frequencies are becoming considerably congested. Certain attempts are being made in various forms to enhance frequency efficiency in the frequency bands currently being used. For example, approaches such as multi-user multiple-input multiple-output (MU-MIMO) communication, high-order modulation, and the like, attempt to use frequency bands as efficiently as possible. However, such attempts have substantially reached their theoretical limits. Also, despite efforts in pursuit of using new broad band frequency resources in bands in the tens of gigahertz (GHz), applying such broad band frequency resources may face difficulties of requiring a short transmission distance, and similar issues, due to severe path loss as such signals attenuate rapidly with increasing distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a communication method for device-to-device (D2D) in a multi-hop network including multiple heterogeneous cells, including configuring a network topology using at least one cooperating base station to communicate between devices included in the multiple heterogeneous cells, creating an association between multiple device pairs and at least one cooperating base station based on configuring the network topology, and determining a cooperation context for communication between the multiple device pairs.

The configuring of the network topology may include selecting multiple device pairs, each including a transmission device and a reception device, to communicate with one another from among the devices included in the multiple heterogeneous cells, and selecting at least one cooperating base station to communicate between the multiple device pairs.

The creating of the association may include transmitting, to the multiple device pairs, information on the at least one cooperating base station, and transmitting information on the multiple device pairs to the at least one cooperating base station.

The determining of the cooperation context may include collecting channel information from the multiple device pairs, determining a coefficient for controlling interference in communication between the multiple device pairs using the channel information, and determining a cooperation context including at least one of allocation information and scheduling information of wireless resources based on the coefficient for controlling the interference.

The communication method may further include transmitting the cooperation context to the multiple device pairs and the at least one cooperating base station.

The communication method may further include receiving data for the reception device from the transmission device, processing the received data using the coefficient for controlling the interference, and transmitting the processed data to the reception device.

The communication method may further include collecting information including at least one of a change of service quality required by the transmission device and the reception device, a change of service quality provided by the at least one cooperating base station, and a change of a channel state in the network, switching the network topology based on the collected information, and determining a cooperation context for the switched network topology.

The changing of the network topology may include changing the at least one cooperating base station to include another base station based on the collected information.

The multiple heterogeneous cells may include at least one of a macro-cell, a micro-cell, a distributed antenna system (DAS), a wireless fidelity (Wi-Fi) access zone, and a cloud-cell.

In another general aspect, a communication method for device-to-device (D2D) in a multi-hop network including multiple heterogeneous cells includes receiving, by a reception device included in the multiple heterogeneous cells, data transmitted from a transmission device included in the multiple heterogeneous cells, wherein the data transmitted from the transmission device corresponds to data processed in a base station for communication between the transmission device and the reception device through the multi-hop network including multiple heterogeneous cells.

The multiple heterogeneous cells may include at least one of a macro-cell, a micro-cell, a distributed antenna system (DAS), a wireless fidelity (Wi-Fi) access zone, and a cloud-cell.

The base station may be configured to configure a network topology using at least one cooperating base station for communication between the transmission device and the reception device.

The base station may be configured to create an association between the transmission device and the reception device, and the at least one base station based on configuring the network topology.

The base station may be configured to create a cooperation context for communication between the transmission device and the reception device.

The base station may be configured to collect information including at least one of a change of a service quality required by the transmission device and the reception device, a change of a service quality provided by the at least one base station, and a change of a channel state in the network, and switch the network topology based on the collected information.

In another general aspect, a non-transitory computer-readable storage medium stores a program for device-to-device (D2D) in a multi-hop network including multiple heterogeneous cells, the program including instructions for causing a computer to carry out the first method presented above.

In another general aspect, a communication apparatus for device-to-device (D2D) in a multi-hop network including multiple heterogeneous cells includes a configurer configured to configure a network topology using at least one cooperating base station to communicate between devices included in the multiple heterogeneous cells, an association creator configured to create an association between multiple device pairs and at least one base station based on configuring the network topology, and a determiner configured to determine a cooperation context for communication between the multiple device pairs.

The configurer may include a selector configured to select multiple device pairs, each including a transmission device and a reception device, to communicate with one another from among the devices included in the multiple heterogeneous cells, and select at least one cooperating base station to communicate between the multiple device pairs.

The determiner may include a channel information collector configured to collect channel information from the multiple device pairs, a coefficient determiner configured to determine a coefficient for controlling interference in communication between the multiple device pairs using the channel information, and a context determiner configured to determine a cooperation context including at least one of allocation information and scheduling information of wireless resources based on the coefficient for controlling the interference.

The communications apparatus may further include a receiver configured to receive data for the reception device from the transmission device, a processor configured to process the data using the coefficient for controlling the interference, and a transmitter configured to transmit the processed data to the reception device.

The communications apparatus may further include an information collector configured to collect information including at least one of a change of a service quality required by the transmission device and the reception device, a change of a service quality provided by the at least one cooperating base station, and a change of a channel state of the network, and a switch configured to switch the network topology based on the collected information, wherein the context determiner is configured to determine a cooperation context for the switched network topology.

In another general aspect, a communication apparatus for device-to-device (D2D) in a multi-hop network including multiple heterogeneous cells includes a reception device included in the multiple heterogeneous cells configured to receive data transmitted from a transmission device included in the multiple heterogeneous cells, wherein the data transmitted from the transmission device corresponds to data processed in a base station for communication between the transmission device and the reception device through the multi-hop network including multiple heterogeneous cells.

The multiple heterogeneous cells may include at least one of a macro-cell, a micro-cell, a distributed antenna system (DAS), a wireless fidelity (Wi-Fi) access zone, and a cloud-cell.

The base station may be configured to configure a network topology using at least one cooperating base station for communication between the transmission device and the reception device.

The base station may be configured to create an association between the transmission device and the reception device, and the at least one base station based on configuring the network topology.

The base station may be configured to create a cooperation context for communication between the transmission device and the reception device.

The base station may be configured to collect information including at least one of a change of a service quality required by the transmission device and the reception device, a change of a service quality provided by the at least one base station, and a change of a channel state in the network, and switch the network topology based on the collected information.

Other features and aspects will be apparent from the following detailed description, the drawings, and the claims.

Figure 1:
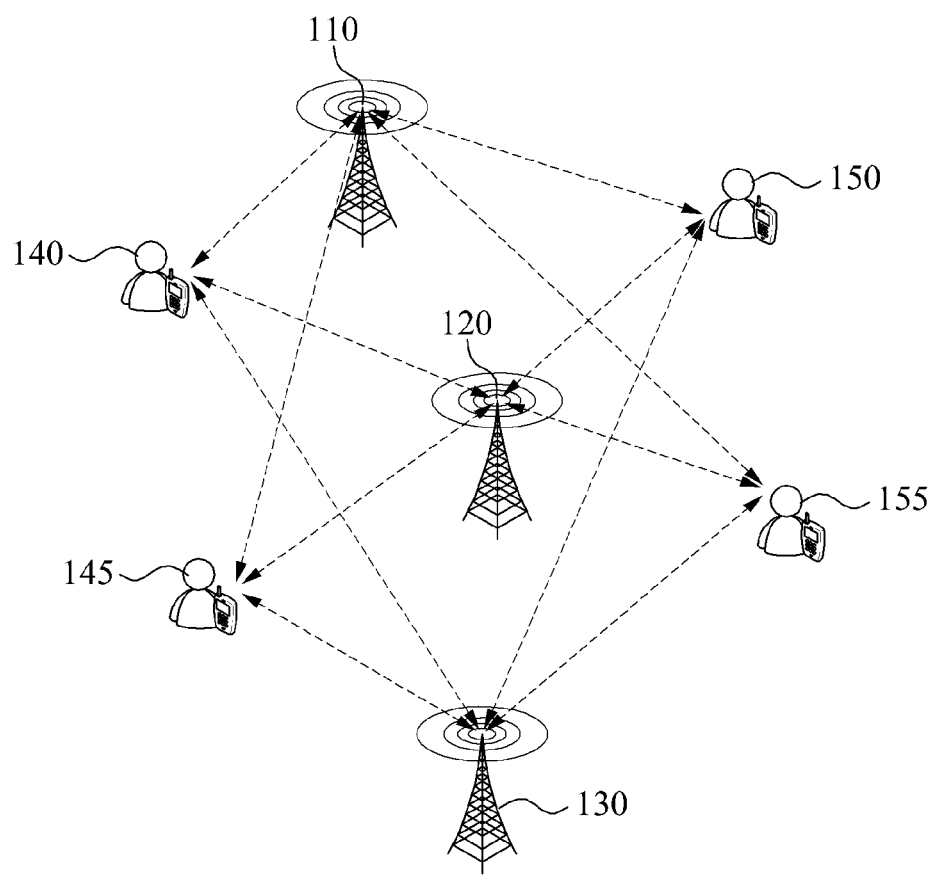
FIG. 1 is a diagram illustrating an example of a network environment in which a communication method for device-to-device (D2D) is performed, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a network environment in which a communication method for device-to-device (D2D) is performed, according to an embodiment.

Referring to FIG. 1, the network environment in which the communication method for D2D is performed in FIG. 1 refers to a multi-hop network including multiple heterogeneous cells. For example, such a multi-hop network including multiple heterogeneous cells in the example shown in FIG. 1 includes base stations 110, 120, and 130 and devices 140, 145, 150, and 155.

The base stations 110, 120, and 130, for example, refer to cooperating base stations for communication between devices. Such base stations provide serving functionality for communication in multiple heterogeneous cells. For example, the multiple heterogeneous cells include various types of small cells, such as a macro-cell, a micro-cell, a cloud-cell, and the similar zones. The cells may also include other types of communications cells, such as a wireless fidelity (Wi-Fi) zone or a distributed antenna system (DAS).

The devices 140, 145, 150, and 155 are examples of devices included in the multiple heterogeneous cells. Examples of the devices include user equipment, for example, a personal computer (PC), a netbook, a laptop, a smart phone, and similar electronic devices. Other examples of user equipment may include tablets, portable gaming consoles, personal digital assistants (PDAs), and the like. These are merely example pieces of user equipment, and the devices 140, 145, 150, and 155 may be any appropriate electronic communication devices provided with communication functions, which may use an appropriate combination of wired and wireless networking to communicate with each other.

Unlike conventional D2D communication, when devices attempt to communicate data directly between the devices with each other, according to an example, the devices utilize a micro-cell base station or other infrastructural elements, such as those discussed above, as intermediaries to process D2D communication in a multi-hop, or multi-session transmission scheme. Transitively, due to such involvement of the micro-cell base station or the other infrastructural elements in the communication between the devices, a communication scheme of the devices according to such an example may seem different from one of the conventional D2D communication schemes.

In the D2D communication approach according to the example discussed herein, a context for cooperation, such as a time for communication between a cooperating base station and a device pair, information on frequency resources, or scheduling information may be shared. Such information provides information about the operational parameters for the cooperating base station and the device with which it is paired so that each device is aware of how to operate so that they can successfully exchange information with one another to facilitate D2D communication using a multi-hop or multi-session transmission scheme. In the D2D communication approach discussed herein, according to an example, the micro-cell base station or the other infrastructural elements that aid in the communication process forwards data or a data packet between devices and as a part of the forwarding process performs a process of removing interference. For example, such a forwarding process includes the process of multiplying a pre-calculated coefficient into the forwarded data for an effect of interference neutralization. However, in the approach provided herein, in some examples the micro-cell base station or the other infrastructural elements does not determine information associated with whether a corresponding packet is transmitted from a legitimate device or determine the destination location and or source location for the data packet's transmission. Because the micro-cell base station does not determine these pieces of information, it does not perform decoding the data packet forwarded between the devices or analyze the data packet.

Because the intervening devices merely forward information, as discussed above, the D2D communication according to the example approach discussed above is suitable for maintaining confidentiality in communication between devices. Thus, the base station or the other infrastructural elements that relay data are physically located between the transmission device and the reception device, as discussed above. However, if the communication infrastructure is considered as a logical operation to characterize how information is transmitted, the D2D communication according to the example is similar to an instance in which a transmission device and a reception device are directly connected. That is, the D2D communication according to an example is functionally the same as traditional D2D communication even though other devices act to relay information as part of the communication process.

Accordingly, the D2D communication according to the above examples refers to D2D communication in a new sense that is distinct from conventional D2D communication. Thus, the D2D communication approach presented herein differs from the conventional D2D communication as described further hereinafter.

For example, conventional D2D communication is potentially incapable of performing simultaneous communication using identical frequencies in the same area. However, the D2D communication presented herein, according to the current examples, employs interference schemes, such as interference neutralization. By using such interference neutralization schemes, it becomes possible to simultaneously support unicast data transmission between devices using identical frequencies, even in the same area.

The D2D communication, according to an example, provides services at a high transmission rate with the aid of micro-cell base stations or other infrastructural elements. The high transmission rate is possible because the micro-cell base stations have multiple transmission/reception antennas that provide a transmission distance that is relatively long. By contrast, conventional D2D communication maintains a relatively short transmission distance to decrease interference between devices. Hence, the D2D communication presented herein is able to simultaneously allow a high transmission rate as well as a fairly long transmission distance, both of which are advantageous for effective communications.

The D2D communication according to an example adaptively coordinates a number of micro-cell base stations or the other infrastructural to allow them to cooperate and thereby facilitate communication between devices. For example, such a system is configured to provide network capacity that is coordinated to correspond to a number of D2Ds.

As a cell radius decrease, the more appropriate the D2D communication presented herein becomes. Hence, the conventional D2D communication becomes less appropriate as a cell radius decreases. Hereinafter, various instances of the communication methods for D2D will be discussed, according to examples.

Figure 2:
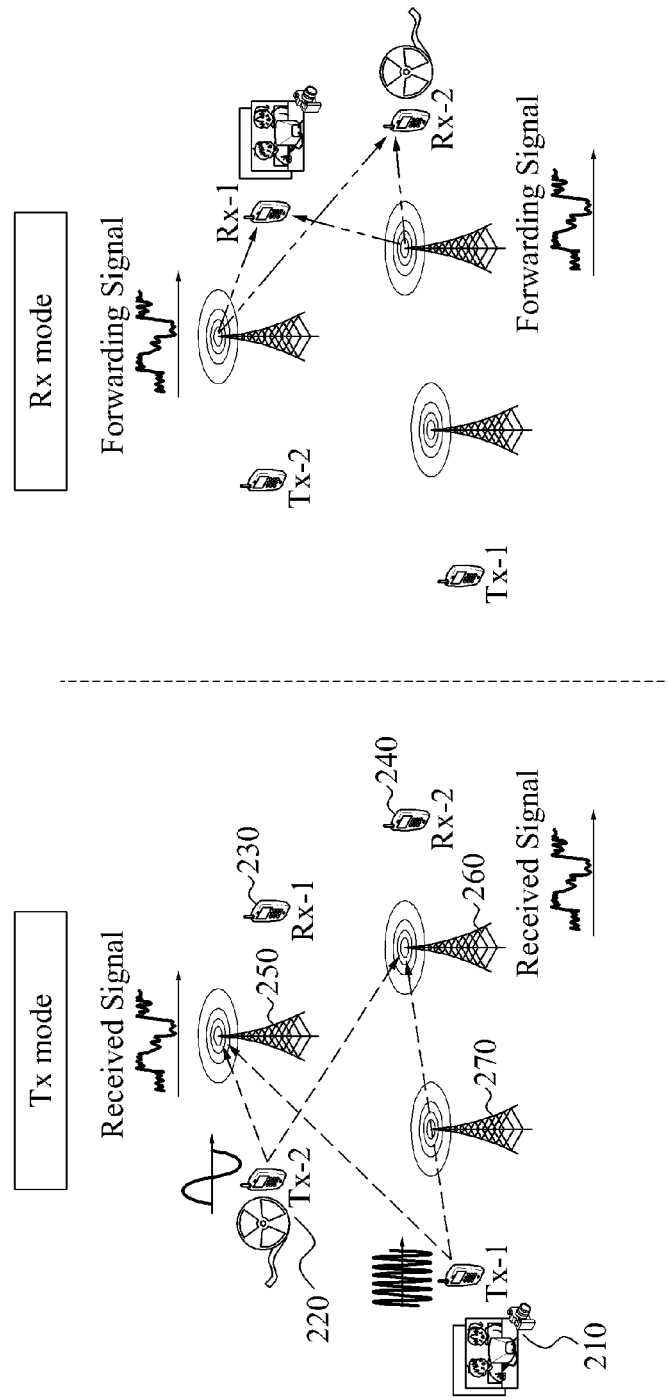
FIG. 2 is a diagram illustrating an example of an operation of a communication method for D2D, according to an embodiment.

FIG. 2 illustrates an example of an operation of a communication method for D2D, according to an embodiment.

Referring to FIG. 2, communication for D2D, according to an example, is performed by user equipment 210, 220, 230, and 240 and micro base stations 250, 260, and 270. The nature of the devices included as user equipment 210, 220, 230, and 240 and micro base stations 250, 260, and 270 has been discussed further above. These elements remove interference or otherwise utilize interference management schemes to cooperate with one another such that user data may be transmitted simultaneously. In the context of FIG. 2, the D2D is performed by user equipment 210, 220, 230, and 240 and micro base stations 250, 260, and 270 that are in close proximity to one another and hence in order for the communication to be successful, the elements use these techniques to manage interference.

In the example of FIG. 2, a transmission user equipment 1 (Tx-1) 210 is assumed to transmit data directly to a reception user equipment 1 (Rx-1) 230, and a transmission user equipment 2 (Tx-2) 220 is assumed to transmit data directly to a reception user equipment 2 (Rx-2) 240.

In conventional D2D communication, the Tx-1 210 and the Tx-2 220 use separate frequency resources to simultaneously communicate signals when communicating with one another, or the Tx-1 210 and the Tx-2 220 communicate signals in an alternating manner with one another. When the Tx-1 210 and the Tx-2 220 communicate signals in an alternating manner, they are permitted to use the same frequency because they are not communicating at the same time.

Additionally, in an example of conventional D2D communication, the Tx-1 210 and the Tx-2 220 forward a signal or data to the micro base station 1 250 and the micro base station 2 260 simultaneously, using an identical frequency.

In Phase I, for example, Transmission Mode (Tx Mode), of FIG. 2, the micro base station 1 250 and the micro base station 2 260 simultaneously receive signals from the Tx-1 210 and the Tx-2 220, transmitted using an identical frequency.

In Phase II, for example, Reception Mode (Rx Mode), the micro base station 1 250 and the micro base station 2 260 perform an appropriate form of processing that provides interference processing on the signals received by the micro base station 1 250 and the micro base station 2 260, and subsequently broadcast to the Rx-1 230 and the Rx-2 240. Signals desired to be received by the Rx-1 230 and the Rx-2 240 are restored because while signals received by the Rx-1 230 and the Rx-2 240 may interact with one another in the Rx-1 230 and the Rx-2 240, receiving the broadcast signals from the micro base stations 250 and 260 includes processing to remove or neutralize interference.

In this example, the micro base stations 250, 260, and 270 cooperate with one another to provide user-oriented services. In particular, a single piece of user equipment is provided with a service by the simultaneous cooperation of several micro base stations.

For example, the micro base stations 250, 260, and 270 include multiple transmission/reception antennas, and are connected by wired and/or wireless backhauls. Here, the backhauls refer to intermediate links between the core or backbone network and the subnetworks that branch off of the core or backbone networks. The multiple transmission/reception antennas provide wireless communication between the constituent parts of the network.

In order to provide communication functionality, the micro base stations 250, 260, and 270 choose parameters and settings and take actions related to the communications process. For example, 250, 260, and 270 select a set or a pair of devices to communicate with one another, select cooperating micro base stations, enable communication between the set or pair of devices in a network, and determine a cooperation context for allocation and scheduling of resources.

Figure 3:
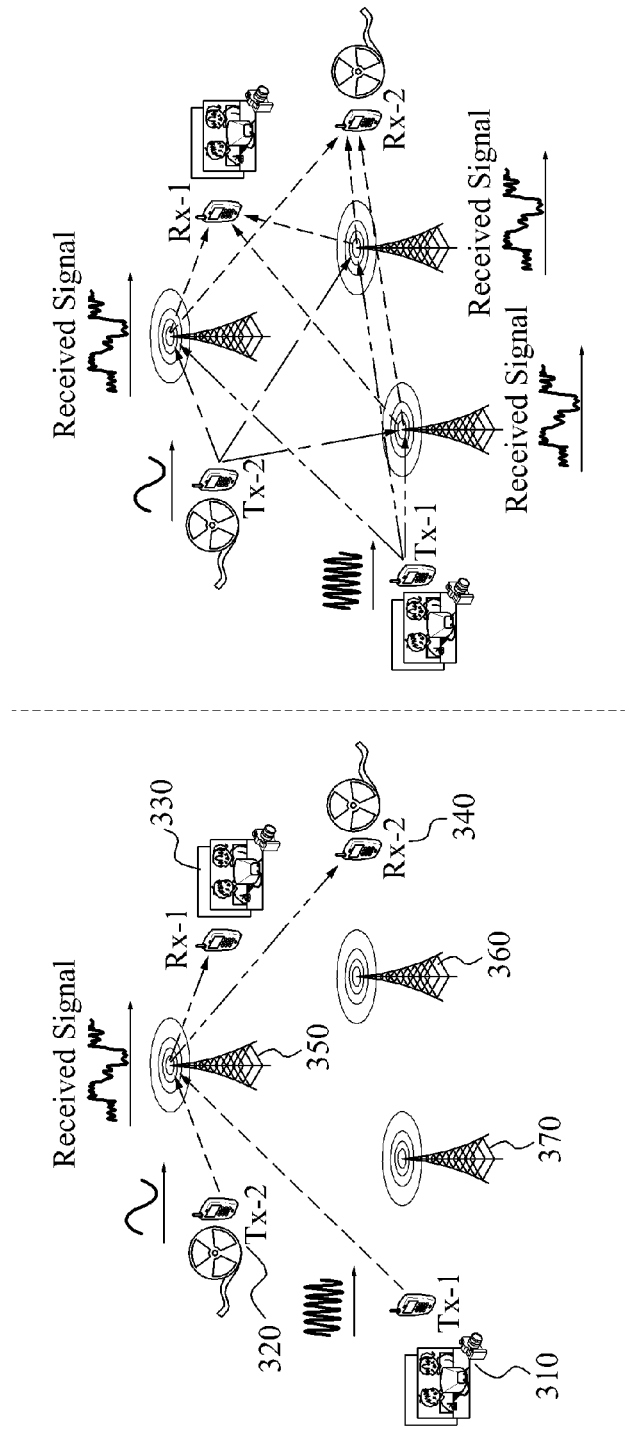
FIG. 3 is a diagram illustrating another example of an operation of a communication method for D2D, according to an embodiment.

FIG. 3 illustrates another example of an operation of a communication method for D2D, according to an embodiment.

Referring to FIG. 3, an example in which micro base stations 350, 360, and 370 relay communication data among user equipment 310, 320, 330, and 340 in the communication process for D2D according to an example is illustrated.

To simultaneously support communication among the user equipment 310, 320, 330, and 340, the micro base station 350 may involve the other the other micro base stations 360 and 370 in various ways. For example, the communications process may not use micro base stations the other micro base stations 360 and 370 at all, aside from the micro base station 350, may use only one of the other micro base stations 360 and 370 as shown in a left image of FIG. 3, or may use at least two micro base stations 360 and 370 as shown in a right image of FIG. 3.

For example, in FIG. 3 the base station 350 that primarily controls communication among the user equipment 310, 320, 330, and 340 is referred to as a master base station. If they are used as part of the communications process, any other micro base stations such as micro base stations 360 and 370 cooperating with the master base station 350 are referred to as a following base station or a serving base station.

In the example of FIG. 3, the master base station 350 dynamically coordinates a number of the following base stations 360 and 370 to provide for their cooperation to aid in communication among the user equipment 310, 320, 330, and 340.

In an example, a single micro base station is utilized when antenna resources of an individual micro base station are sufficient for D2D communication. Alternatively, a greater number of micro base stations are used when the antenna resources are insufficient. The number of micro base stations that are used may be chosen so as to correspond to the number of micro base stations that are necessary to provide sufficient antenna resources. Thus, when an amount of network traffic required for communication between devices is large, a signal may be simultaneously forwarded to the devices through utilizing a greater number of micro base stations, where the number of micro base stations is based on the amount of network traffic they are required to manage.

In the example of FIG. 3, the master base station 350 performs various types of coordination with respect to the cooperating micro base stations in order to facilitate D2D communication between the user equipment 310, 320, 330, and 340. For example, the master base station 350 dynamically coordinates or shifts a configuration of the following base stations 360 and 370, based on an antenna state of the following base stations 360 and 370, an available resource status, a required amount of traffic of the user equipment 310, 320, 330, and 340, and the like, collectively. Thus, the master base station 350 not only transmits data throughout the network, but it also manages the configuration of other elements of the network in order to ensure that the data transmission requirements of the network are met and the resource demands placed on the network do not exceed the available resources for the network.

Figure 4:
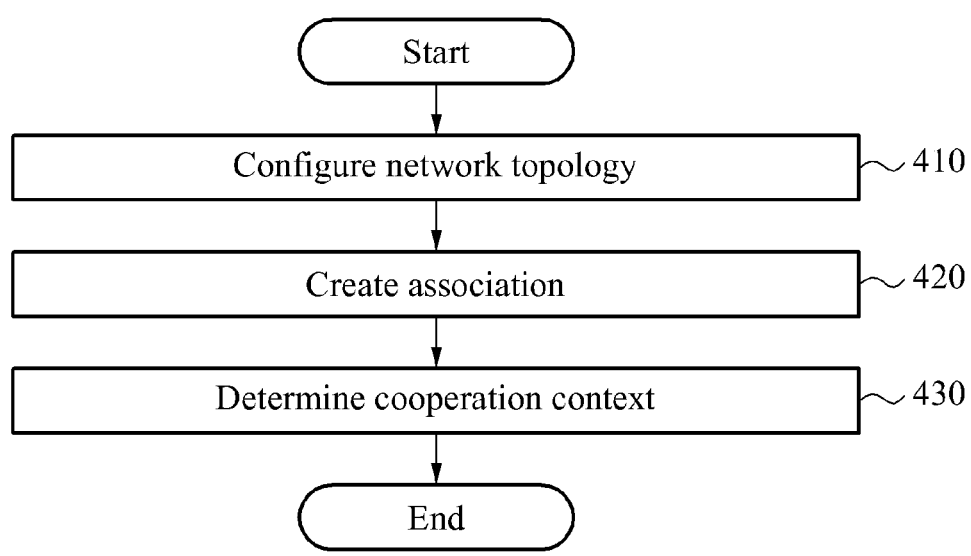
FIG. 4 is a flowchart illustrating an example of a communication method for D2D, according to an embodiment.

FIG. 4 illustrates an example of a communication method for D2D, according to an embodiment.

Referring to FIG. 4, in 410, the method configures a network topology. For example, a communication apparatus for D2D according to an example, hereinafter referred to as a "communication apparatus," configures a network topology, using at least one cooperating base station for communication between devices included in multiple heterogeneous cells.

In 420, the method creates an association. For example, the communication apparatus creates an association between more than one device pair and at least one base station based on configuring the network topology.

In 430, the method determines a cooperation context. For example, the communication apparatus determines a cooperation context for communication between the multiple device pairs. In 430, the communication apparatus determines a cooperation context. Such a cooperation context may be between communication devices, such as cooperating micro base stations, for communication between device pairs, based on the association created in 420. For example, the cooperation context that is determined includes allocation information and scheduling information for wireless resources, such as a time, a frequency, and similar information, which is also referred to as transmitting resources and time information.

The communication apparatus, according to an example, refers to an apparatus for D2D in a multi-hop network including multiple heterogeneous cells. Such a communication network includes, for example, a micro base station or an infrastructure for respective multiple heterogeneous cells. In an example, each of the multiple heterogeneous cells refers to a small cell, such as a macro-cell, a micro-cell, a cloud-cell, and the like, and a Wi-Fi zone or a DAS.

Figure 5:
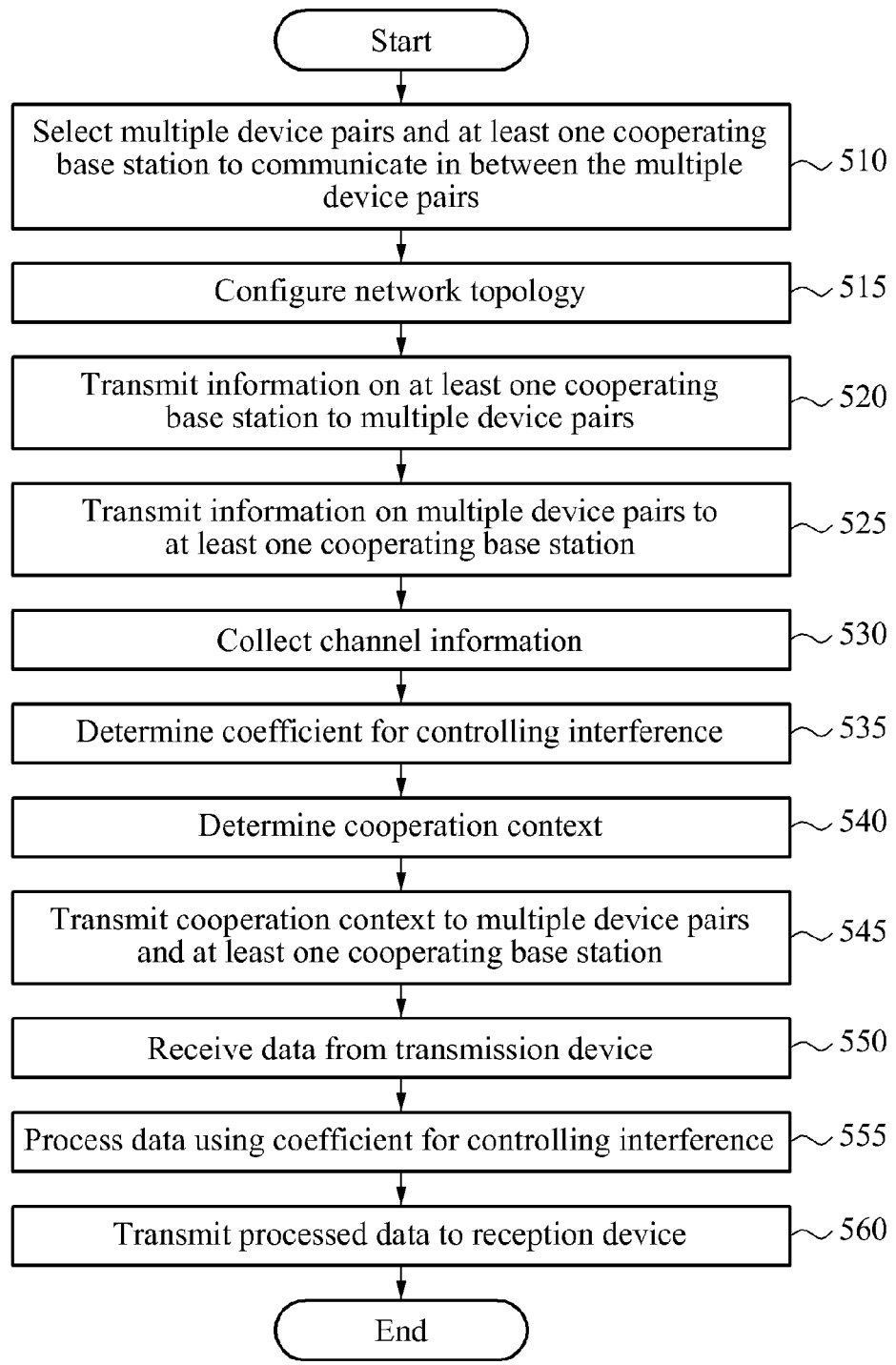
FIG. 5 is a flowchart illustrating another example of a communication method for D2D, according to an embodiment.

FIG. 5 illustrates another example of a communication method for D2D, according to an embodiment.

Referring to FIG. 5, in 510, the method selects multiple device pairs and at least one cooperating base station to communicate in between the multiple device pairs. For example, a communication apparatus selects multiple device pairs and at least one cooperating base station for communication of a device pair. The at least one device pairs may include a transmission device and a reception device to communicate one another from among devices included in multiple heterogeneous cells.

In 515, the method configures a network topology. For example, the communication apparatus configures a network topology using the selected multiple device pairs and the at least one base station.

In 520, the method transmits information on at least one cooperating base station to the multiple device pairs. For example, the communication apparatus transmits information on the at least one cooperating base station to the multiple device pairs configuring the network topology in 520.

In 525, the method transmits information on the multiple device pairs to the at least one cooperating base station. For example, the communication apparatus transmits information on the multiple device pairs to the at least one cooperating base station in 525. An association may be created between the device pair and the at least one base station based on the information transmitted through 520 and 525.

In 530, the method collects channel information. For example, the communication apparatus collects channel information from the multiple device pairs. In an example, the channel information collected in 530 refers to a channel value H including a precise phase θ and an amplitude with respect to signals forwarded between devices.

In 535, the method determines a coefficient for controlling interference. For example, the communication apparatus determines a coefficient for controlling interference that occurs in communication between the multiple device pairs, using the channel information collected in 530. For example, the coefficient determined in 535 corresponds to a coefficient for solving interference occurring in the communication between the multiple device pairs, for example, through schemes of interference alignment or neutralization. Various appropriate schemes are used to perform this functionality.

In 540, the method determines a cooperation context. For example, the communication apparatus determines a cooperation context including allocation information and scheduling information of wireless resources based on the coefficient for controlling the interference determined in 535.

In 545, the method transmits the cooperation context to the multiple device pairs and the at least one cooperating base station. For example, the communication apparatus transmits the cooperation context determined in 540 to the multiple device pairs and the at least one cooperating base station.

In 550, the method receives data from a transmission device. For example, the communication apparatus receives, from a transmission device, data for a reception device. As an example, the data for the reception device received from the transmission device is transmitted to the communication apparatus based on the cooperation context transmitted in 545.

In 555, the method processes data using a coefficient for controlling interference. For example, the communication apparatus processes data using the coefficient for controlling the interference.

In 560, the method transmits the processed data to the reception device. For example, the communication apparatus transmits, to the reception device, the data processed in 555.

Figure 6:
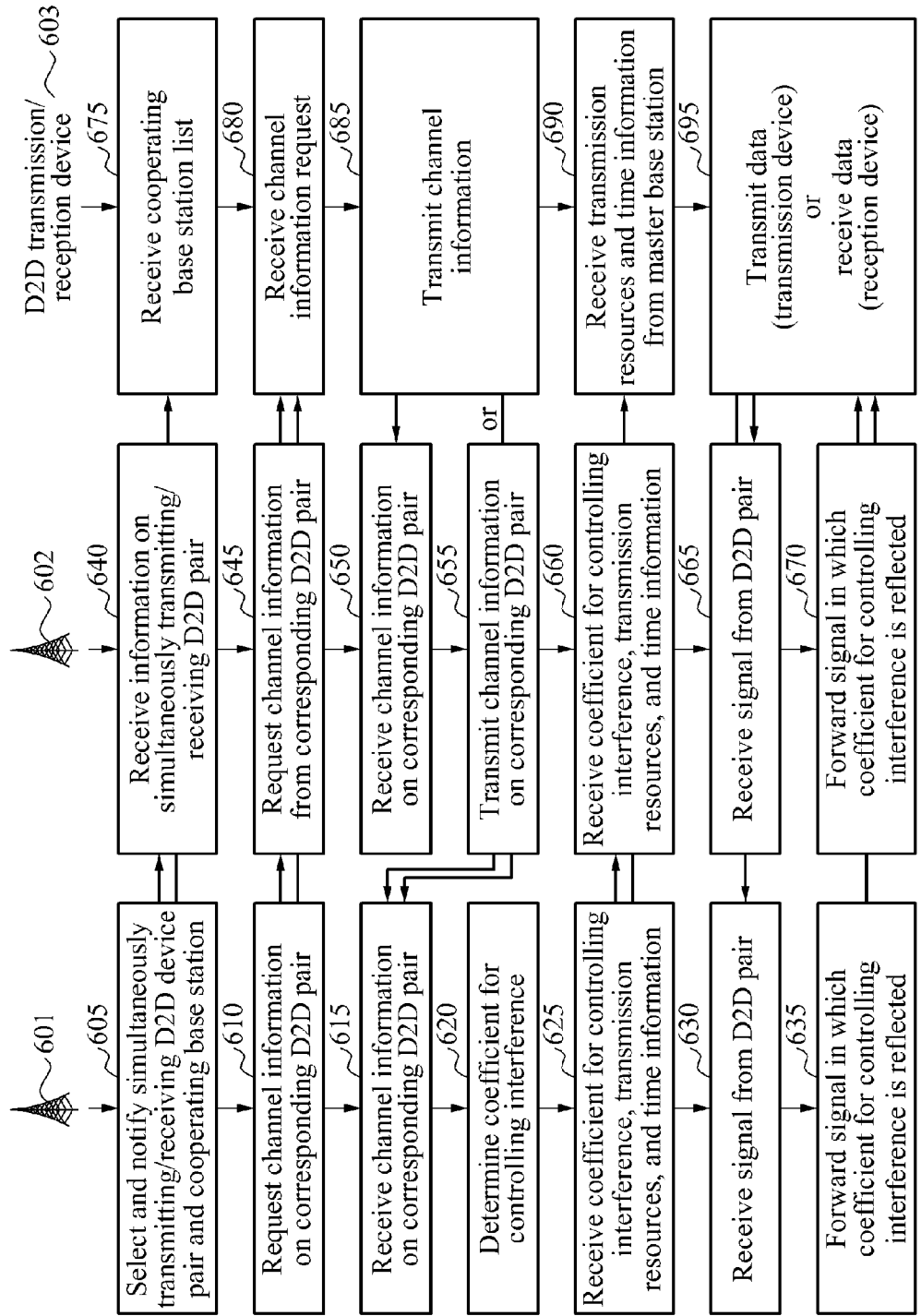
FIG. 6 is a diagram illustrating an example of an operation between at least one base station and multiple device pairs cooperating with one another for D2D, according to an embodiment.

FIG. 6 illustrates an example of an operation between at least one base station and multiple device pairs cooperating with one another for D2D, according to an embodiment.

Referring to FIG. 6, cooperating micro base stations for communication of a device pair 603 operate as a master base station 601 or a following base station 602. In an example, the master base station 601 is pre-selected to be known to all micro base stations in a network.

A function of the master base station 601 may be performed by other base stations, rather than solely by a predetermined micro base station.

Hereinafter, operations performed by the master base station 601 will be described.

In 605, the master base station 601 selects the device pair 603 for performing D2D communication and a cooperating base station, for example, the following base station 602. Also in 605, the master base station provides notification as to a result of the selection to the device pair 603 and the following base station 602, respectively. The device pair 603 may simultaneously transmit and receive data. In an example, the result of the selection forwarded to the device pair 603 is transferred in a form of a list including the following base station 602 involved in the pairing.

In 610, the master base station 601 requests channel information from the device pair 603 selected in 605. In response to the request, the master base station 601 may receive the channel information pertaining to the corresponding D2D pair from the device pair 603 in 615. In this example, the request for the channel information of the device pair 603 may be transferred to the device pair 603 via the following base station 602, transferred directly to the device pair 603 through a means other than the following base station 602, or transferred to the device pair 603 through a combination of transfer paths.

In 620, the master base station 601 determines a coefficient for controlling interference in the device pair 603, based on the channel information received in 615.

In 625, the master base station 601 provides a notification as to allocation information and scheduling information of wireless resources. For example, the allocation and scheduling information includes information such as, for example, a time, a frequency, and similar information that characterize use of wireless resources to help manage these resources. The allocation and scheduling information is derived based on the coefficient determined in 620, to the following base station 602 and the device pair 603. The allocation information and the scheduling information of wireless resources, for example, the time, the frequency, and similar information participate in communication between the device pair 603, and/or are used to configure a cooperation context between cooperating communication apparatuses.

In 630, the master base station 601 receives, from the device pair 603, a signal to be forwarded.

In 635, the master base station 601 reflects, in the signal received in 630, the coefficient for controlling the interference, and forwards the signal. For example, the master base station 601 broadcasts the signal toward receivers, for example, destination devices, by multiplying the coefficient determined in 620 to the signal received in 630 and broadcasting the resulting signal Because the coefficient has been incorporated into the signal, the interference that would otherwise be present in the signal is controlled.

Hereinafter, operations performed by the following base station 602 will be described.

In 640, the following base station 602 receives a result of the selection of the device pair 603 transmitted from the master base station 601 in 605. The result received is information that characterizes the device pair 603.

In 645, the following base station 602 receives a request of channel information on the device pair 603 transmitted from the master base station 601 in 610, and transfers the received request to the device pair 603. Thus, the following base station 602 relays the request in this operation.

The following base station 602 receives the channel information transmitted from the device pair 603 in response to the request of 645 in 650, and transmits the received channel information to the master base station in 655. Thus, the following base station 602 also acts as an intermediary to provide the channel information. As an example, the channel information transmitted by the device pair 603 is be transferred directly to the master base station 601, or transferred via the following base station 602.

In 660, the following base station 602 receives allocation information and scheduling information of wireless resources. For example, the allocation information and scheduling information may include a time, a frequency, and the like, based on the coefficient for controlling interference in the device pair 603 transmitted from the master base station 601 in 625.

In 665, the following base station 602 receives the signal forwarded from the device pair 603, and forwards the signal to the master base station 601.

In 670, the following base station 602 receives the signal transmitted from the master base station 601 in 635, in which the coefficient for controlling the interference is reflected, and forwards the received signal to the device pair 603.

Hereinafter, operations of the device pair 603 including the transmission device and the reception device performing D2D communication will be described.

In 675, the device pair 603 receives a result of the selection of the cooperating base station. For example, in FIG. 6 the cooperating base station is selected as following base station 602, which is transmitted from the following base station 602 in 640. In this example, the result of the selection of the cooperating base station transferred to each device pair 603 is transferred in the form of the list of the following base station 602.

In 680, the device pair 603 receives the request for the channel information from the device pair 603 transmitted from the master base station 601, or the following base station 602 in 610, and transmits the channel information of the device pair 603 in 685. For example, the device pair 603 may have the ability to characterize the channel information with which it is associated so that such information may be shared with the base stations.

In 690, the device pair 603 receives allocation information and scheduling information of wireless resources, for example, a time, a frequency, and similar information, transmitted from the master base station 601 or the following base station 602. Such information is used to set configuration parameters when the wireless communication actually occurs.

In 695, the transmission device of the device pair 603 forwards a signal of the transmission device by utilizing predetermined resources at a predetermined time, based on the allocation information and the scheduling information received in 690, and restores the signal of the transmission device from the signal received from the following base station 602. In this example, the signal received by the reception device from the following base station 602 corresponds to a signal transmitted from the master base station 601, in which the coefficient for controlling the interference is reflected. Hence, the device pair 603 routes the signal through the base station, and as a part of this routing process, the interference is controlled by use of the coefficient.

Figure 7:
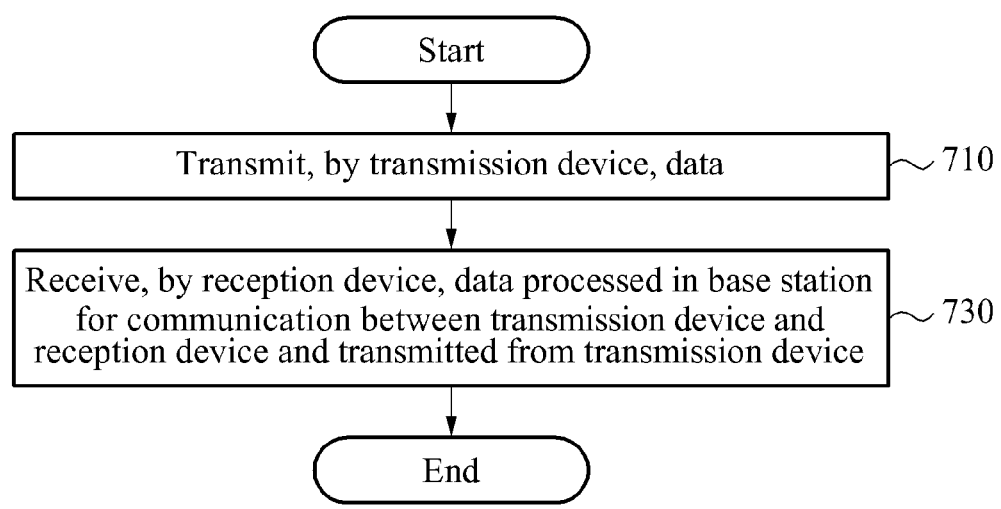
FIG. 7 is a flowchart illustrating still another example of a communication method for D2D, according to an embodiment.

FIG. 7 illustrates still another example of a communication method for D2D, according to an embodiment.

In 710, the method transmits, by a transmission device, data.

In 730, the method receives, by a reception device, data processed in a base station for communication between the transmission device and the reception device and transmitted from the transmission device.

Referring to FIG. 7, in the communication method for D2D in a multi-hop network including multiple heterogeneous cells, when a transmission device transmits data to a reception device in 710, the reception device receives the data transmitted from the transmission device in 730. In this example, the data transmitted from the transmission device corresponds to data processed in a base station for communication between the transmission device and the reception device.

For example, the multiple heterogeneous cells may include a small cell, such as a macro-cell, a micro-cell, a cloud-cell, and the like, and/or a Wi-Fi access zone or a DAS.

For example, the operation of the base station in the communication method of FIG. 7 may be as follows.

The base station configures a network topology using a least one cooperating base station to communicate between devices included in the multiple heterogeneous cells.

The base station creates an association between the transmission device and the reception device, and at least one base station when configuring the network topology. In an example, the base station further creates a cooperation context for communication between the transmission device and the reception device.

In an example, the base station collects information including at least one of a change of service quality required by the transmission device and the reception device, a change of service quality provided by the at least one cooperating base station, and a change of a channel state in the multi-hop network. Such information characterizes the resources available and demanded in the network. The base station switches the network topology based on the collected information. For example, the base station switches the network topology as resources become available or become required, to manage resources effectively so that the network is not overloaded and functions well.

Figure 8:
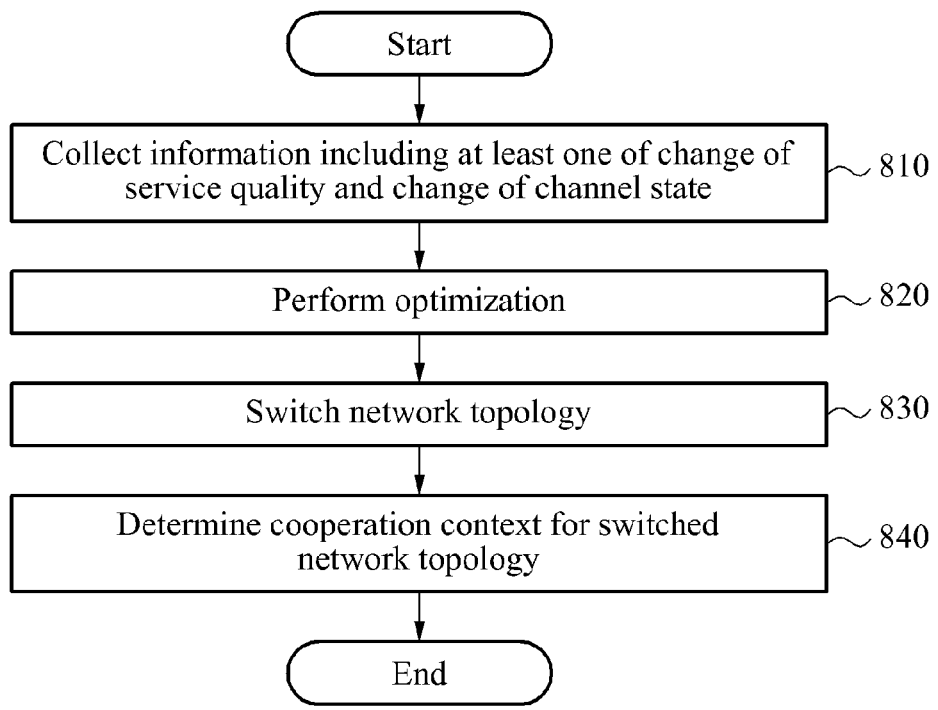
FIG. 8 is a flowchart illustrating yet another example of a communication method for D2D, according to an embodiment.

FIG. 8 illustrates yet another example of a communication method for D2D, according to an embodiment. Referring to FIG. 8, a method of switching a network topology in a communication apparatus according to an example is illustrated.

In 810, the method collects information including at least one of change of service quality and change of channel state. For example, the communication apparatus collects information including at least one of a change of service quality required by the transmission device and the reception device, a change of service quality provided by the at least one cooperating base station, and a change of a channel state in the multi-hop network. In this example, the communication apparatus optionally collects corresponding information via a control channel.

In 820, the method performs optimization. For example, the communication apparatus optimizes a network or a network configuration based on the information collected in 810. The network optimization is performed using one or more of various generally used optimization schemes that configures the network to optimize the network. For example, optimizing the network may include maximizing one or more metrics of network performance.

In 830, the method switches network topology. For example, the communication apparatus switches the network topology. In 830, the communication apparatus switches the network topology through switching following base stations based on the information collected in 810, and/or switch the network topology based on the network configuration optimized in 820. In this example, a micro base station operating as a master base station and a micro base station operating as a following base station switch functions and configurations of one another to optimize the network topology in a manner that is helpful.

In 840, the method determines a cooperation context for the switched network topology. For example, the communication apparatus determines a cooperation context for the network topology switched in 830. In 840, the communication apparatus determines allocation information and scheduling information of wireless resources optimized with respect to the switched following base stations.

Figure 9:
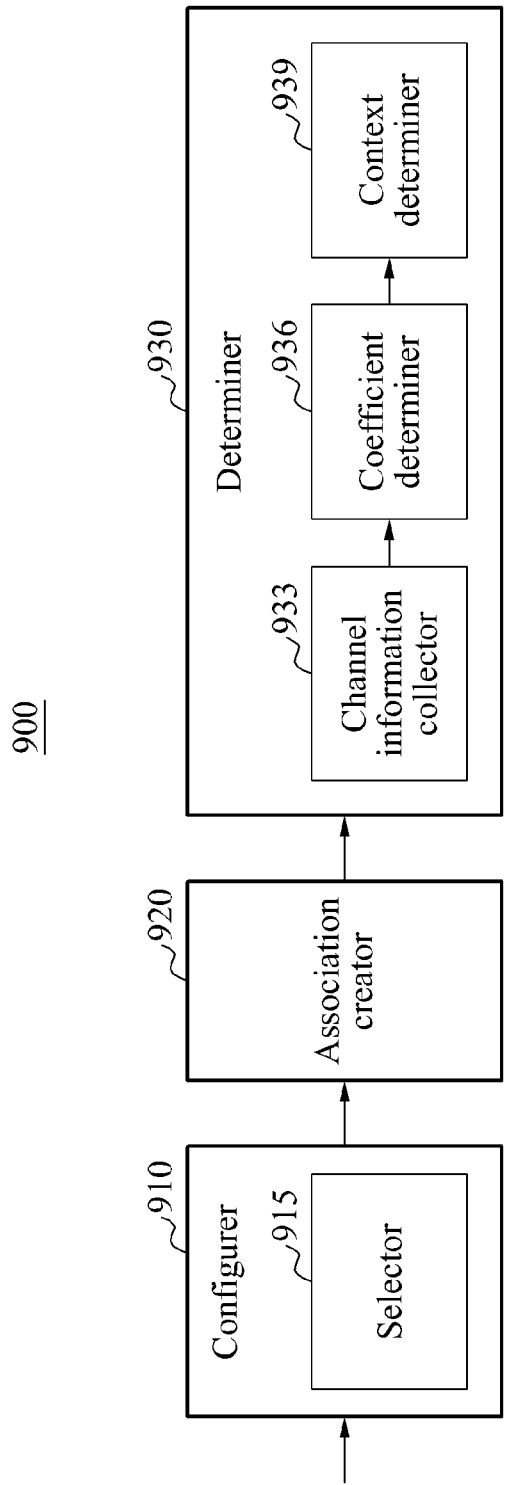
FIG. 9 is a block diagram illustrating an example of a communication apparatus for D2D, according to an embodiment.

FIG. 9 illustrates an example of a communication apparatus 900 for D2D, according to an embodiment.

Referring to FIG. 9, the communication apparatus 900 refers to an apparatus for D2D in a multi-hop network including multiple heterogeneous cells. For example, FIG. 9 includes micro base stations for the multiple heterogeneous cells.

For example, the communication apparatus 900 includes a configurer 910, an association creator 920, and a determiner 930.

The configurer 910 configures a network topology using at least one cooperating base station to communicate between devices included in the multiple heterogeneous cells. In an example, the configurer 910 includes a selector 915.

The selector 915 selects multiple device pairs including a transmission device and a reception device to communicate with one another from among the devices included in the multiple heterogeneous cells. The selector 915 selects at least one cooperating base station to communicate between multiple device pairs. The selector 915 configures the network topology using the selected multiple device pairs and the selected at least one base station.

The association creator 920 creates an association between the multiple device pairs and the at least one base station when configuring the network topology.

The determiner 930 determines a cooperation context for communication between the multiple device pairs. In an example, the determiner 930 includes a channel information collector 933, a coefficient determiner 936, and a context determiner 939.

The channel information collector 933 collects the channel information from the multiple device pairs.

The coefficient determiner 936 determines a coefficient for controlling interference in communication between the multiple device pairs using the channel information. Here, the coefficient determined by the coefficient determiner 936 corresponds to a coefficient capable of solving interference issues by processing data transmitted between the multiple device pairs in communication, such as by using interference neutralization.

The context determiner 939 determines a cooperation context including information such as allocation information and scheduling information of wireless resources based on the coefficient determined by the coefficient determiner 936.

The context determiner 939 determines scheduling information for a session or a link unit to be scheduled in a multi-hop simultaneously with one another, and determines allocation information on wireless resources such as a time or a frequency to be allocated based on the scheduling information. The context determiner 939 performs scheduling in a unit of cooperative, coordinated sessions. For example, the context determiner 939 performs the multi-hops, to be simultaneously scheduled with one another.

Figure 10:
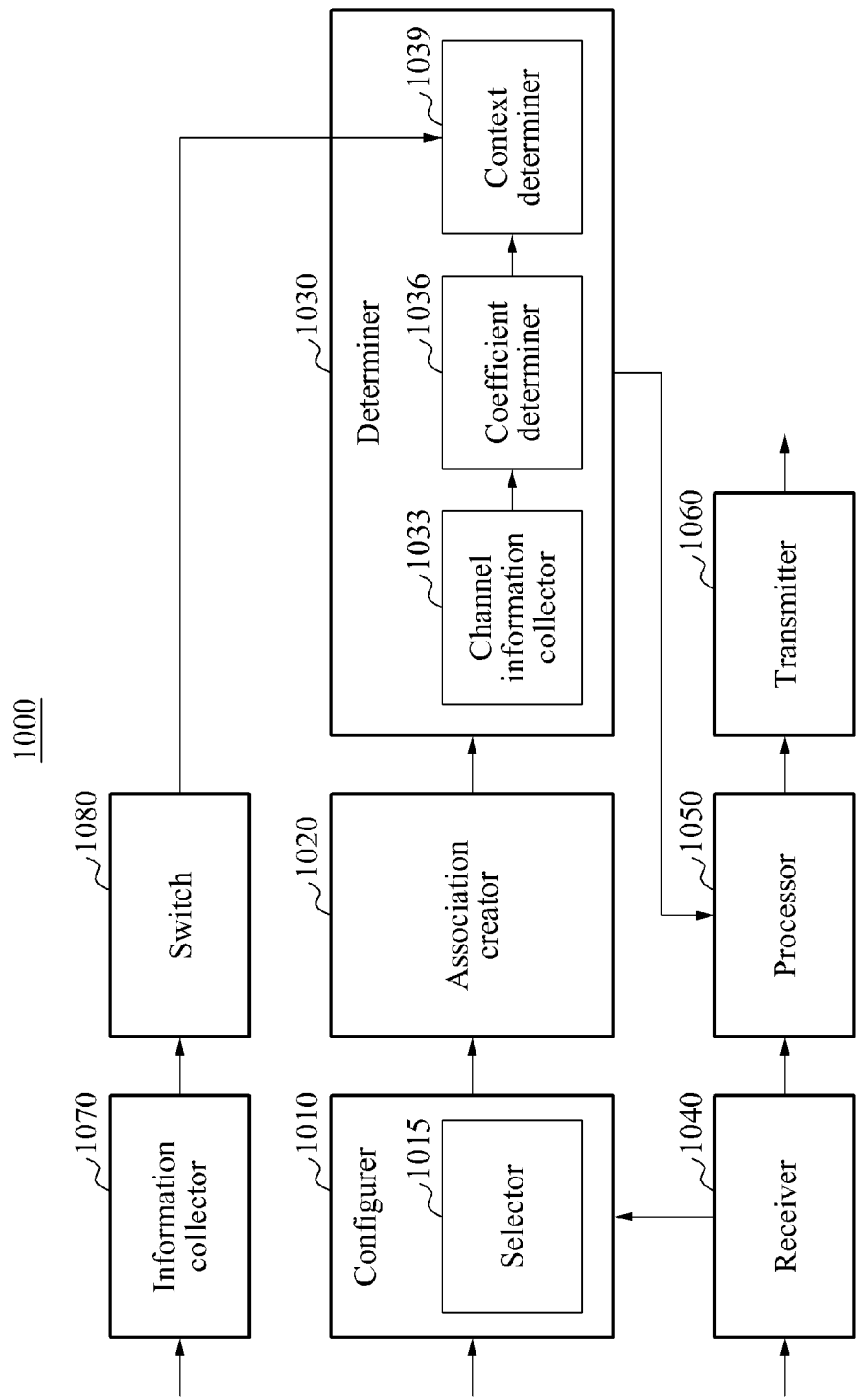
FIG. 10 is a block diagram illustrating another example of a communication apparatus for D2D, according to an embodiment.

FIG. 10 illustrates another example of a communication apparatus 1000 for D2D, according to an embodiment.

Referring to FIG. 10, the communication apparatus 1000 includes a configurer 1010, an association creator 1020, and a determiner 1030. In the example of FIG. 10, the communication apparatus 1000 further includes a receiver 1040, a processor 1050, a transmitter 1060, an information collector 1070, and a switch 1080. However, the communication apparatus 1000 may omit some of these constituent elements, or include other elements in addition to or in lieu of the elements listed here.

The configurer 1010 configure a network topology using at least one cooperating base station to communicate between devices included in multiple heterogeneous cells. In an example, the configurer 1010 includes a selector 1015.

The selector 1015 selects multiple device pairs, each device pair including a transmission device and a reception device designated to communicate with one another from among the devices included in the heterogeneous cells. The selector 1015 selects at least one cooperating base station for communication between the multiple device pairs.

The association creator 1020 creates an association between the multiple device pairs and the at least one base station when configuring the network topology.

The determiner 1030 determines a cooperation context for communication between the multiple device pairs. In the example of FIG. 10, the determiner 1030 includes a channel information collector 1033, a coefficient determiner 1036, and a context determiner 1039.

The channel information collector 1033 collects channel information from the multiple device pairs.

The coefficient determiner 1036 determines a coefficient for controlling interference in communication between the multiple device pairs, using the channel information collected by the channel information collector 1033.

The context determiner 1039 determines a cooperation context including allocation information and scheduling information of wireless resources based on the coefficient determined in the coefficient determiner 1036.

The receiver 1040 receives data for the reception device from the transmission device.

The processor 1050 processes the received data for the reception device, using the coefficient for controlling the interference determined in the coefficient determiner 1036.

The transmitter 1060 transmits, to the reception device, the data processed in the processor 1050.

The information collector 1070 collects information including, for example, at least one of a change of service quality required by the transmission device and the reception device, a change of service quality provided by the at least one cooperating base station, and a change of a channel state in the network. However, these are merely examples and other information about network configuration and performance may also be gathered by the information collector 1070.

The switch 1080 switches the network topology based on the information collected in the information collector 1070. For example, the information collected in the information collector 1070 is used to indicate ways to reconfigure the network topology to improve network performance, and then the switch 1080 performs a switch of network topology based on such information.

The examples of a communication method and apparatus for device-to-device (D2D) offer a way to provide enhanced communication using multi-hop communication and interference neutralization to facilitate high-speed communication over longer distances while effectively managing interference.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a to digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, to functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of master base station for device-to-device (D2D) in a multi-hop network including multiple heterogeneous cells, comprising:
configuring a network topology using at least one cooperating base station to communicate between devices included in the multiple heterogeneous cells;
selecting multiple device pairs, each including a transmission device and a reception device, to communicate with one another from among the devices included in the multiple heterogeneous cells; and
selecting at least one cooperating base station to communicate between the multiple device pairs;
collecting information including at least one of a change of service quality required by the transmission device and the reception device, a change of service quality provided by at least one cooperating base station, and a change of a channel state in the network;
switching the network topology based on the collected information;
changing the at least one cooperating base station to include another base station based on the collected information;
creating an association between multiple device pairs and at least one cooperating base station based on configuring the network topology; and
determining a cooperation context for communication between the multiple device pairs,
wherein the master base station dynamically coordinates a configuration of the cooperating base station to provide for their cooperation to aid in communication among the devices.

2. The communication method of claim 1, wherein the creating of the association comprises:
transmitting, to the multiple device pairs, information on the at least one cooperating base station; and
transmitting information on the multiple device pairs to the at least one cooperating base station.

3. The communication method of claim 1, wherein the determining of the cooperation context comprises:
collecting channel information from the multiple device pairs;
determining a coefficient for controlling interference in communication between the multiple device pairs using the channel information ; and
determining a cooperation context including at least one of allocation information and scheduling information of wireless resources based on the coefficient for controlling the interference.

4. The communication method of claim 3, further comprising:
transmitting the cooperation context to the multiple device pairs and the at least one cooperating base station.

5. The communication method of claim 3, further comprising:
receiving data for the reception device from the transmission device;
processing the received data using the coefficient for controlling the interference; and
transmitting the processed data to the reception device.

6. The communication method of claim 1, further comprising:
determining a cooperation context for the switched network topology.

7. The communication method of claim 1, wherein the multiple heterogeneous cells comprise at least one of a macro-cell, a micro-cell, a distributed antenna system (DAS), a wireless fidelity (Wi-Fi) access zone, and a cloud-cell.

8. A non-transitory computer-readable storage medium storing a program for device-to-device (D2D) in a multi-hop network including multiple heterogeneous cells, the program comprising instructions for causing a computer to carry out the method of claim 1.

9. The communication apparatus of claim 8, wherein the one or more processors are configured to select multiple device pairs, each including a transmission device and a reception device, to communicate with one another from among the devices included in the multiple heterogeneous cells, and select at least one cooperating base station to communicate between the multiple device pairs.

10. The communication apparatus of claim 8, wherein the one or more processors are configured to:
collect channel information from the multiple device pairs;
determine a coefficient for controlling interference in communication between the multiple device pairs using the channel information; and
determine a cooperation context including at least one of allocation information and scheduling information of wireless resources based on the coefficient for controlling the interference.

11. The communication apparatus of claim 9, further comprising:
a receiver configured to receive data for the reception device from the transmission device;
and
a transmitter configured to transmit the processed data to the reception device;
wherein the one or more processor are further configured to process the data using the coefficient for controlling the interference.

12. The communication apparatus of claim 9, wherein the one or more processor are configured to:
collect information including at least one of a change of a service quality required by the transmission device and the reception device, a change of a service quality provided by the at least one cooperating base station, and a change of a channel state of the network; and switch the network topology based on the collected information, determine a cooperation context for the switched network topology.

13. A communication method of device for device-to-device (D2D) in a multi-hop network including multiple heterogeneous cells, comprising:

selecting multiple device pairs, each including a transmission device and a reception device, to communicate with one another from among devices included in the multiple heterogeneous cells; and selecting at least one cooperating base station to communicate between the multiple device pairs collecting information including at least one of a change of service quality required by the transmission device and the reception device, a change of service quality provided by at least one cooperating base station, and a change of a channel state in the network;

switching a network topology based on the collected information;

changing the at least one cooperating base station to include another base station based on the collected information;

receiving, by the reception device included in the multiple heterogeneous cells, data transmitted from the transmission device included in the multiple heterogeneous cells, wherein the data transmitted from the transmission device corresponds to data processed in a master base station for communication between the transmission device and the reception device through the multi-hop network including multiple heterogeneous cells, wherein the master base station dynamically coordinates a configuration of the cooperating base station to provide for their cooperation to aid in communication among the devices.

14. The communication method of claim 13, wherein the multiple heterogeneous cells comprise at least one of a macro-cell, a micro-cell, a distributed antenna system (DAS), a wireless fidelity (Wi-Fi) access zone, and a cloud-cell.

15. The communication method of claim 13, wherein the master base station is configured to configure a network topology using at least one cooperating base station for communication between the transmission device and the reception device.

16. The communication method of claim 15, wherein the master base station is configured to create an association between the transmission device and the reception device, and the at least one cooperating base station based on configuring the network topology.

17. The communication method of claim 13, wherein the master base station is configured to create a cooperation context for communication between the transmission device and the reception device.

18. The communication method of claim 13, wherein the master base station is configured to collect information including at least one of a change of a service quality required by the transmission device and the reception device, a change of a service quality provided by the at least one cooperating base station, and a change of a channel state in the network, and switch the network topology based on the collected information.

19. A communication apparatus for device-to-device (D2D) in a multi-hop network including multiple heterogeneous cells, comprising memory having stored thereon computer instructions executable by one or more processors configured to:

configure a network topology using at least one cooperating base station to communicate between devices included in the multiple heterogeneous cells;

select multiple device pairs, each including a transmission device and a reception device, to communicate with one another from among the devices included in the multiple heterogeneous cells;

select the at least one cooperating base station to communicate between the multiple device pairs;

collect information including at least one of a change of service quality required by the transmission device and the reception device, a change of service quality provided by at least one cooperating base station, and a change of a channel state in the network;

switch the network topology based on the collected information;

change the at least one cooperating base station to include another base station based on the collected information;

create an association between multiple device pairs and at least one base station based on configuring the network topology;

determine a cooperation context for communication between the multiple device pairs, and dynamically coordinate a configuration of the cooperating base station to provide for their cooperation to aid in communication among the devices.

20. A communication apparatus for device-to-device (D2D) in a multi-hop network including multiple heterogeneous cells, comprising memory having stored thereon computer instructions executable by one or more processors configured to:

select multiple device pairs, each including a transmission device and a reception device, to communicate with one another from among the devices included in the multiple heterogeneous cells; and select at least one cooperating base station to communicate between the multiple device pairs, collect information including at least one of a change of service quality required by a transmission device and a reception device, a change of service quality provided by at least one cooperating base station, and a change of a channel state in the network;

switch a network topology based on the collected information;

changing the at least one cooperating base station to include another base station based on the collected information;

the reception device included in the multiple heterogeneous cells configured to receive data transmitted from the transmission device included in the multiple heterogeneous cells, wherein the data transmitted from the transmission device corresponds to data processed in a master base station for communication between the transmission device and the reception device through the multi-hop network including multiple heterogeneous cells, wherein the master base station dynamically coordinates a configuration of the cooperating master base station to provide for their cooperation to aid in communication among the devices.

21. The communication apparatus of claim 20, wherein the multiple heterogeneous cells comprise at least one of a macro-cell, a micro-cell, a distributed antenna system (DAS), a wireless fidelity (Wi-Fi) access zone, and a cloud-cell.

22. The communication apparatus of claim 20, wherein the master base station is configured to configure a network topology using at least one cooperating base station for communication between the transmission device and the reception device.

23. The communication apparatus of claim 20, wherein the master base station is configured to create an association between the transmission device and the reception device, and the at least one cooperating base station based on configuring the network topology.

24. The communication apparatus of claim 20, wherein the master base station is configured to create a cooperation context for communication between the transmission device and the reception device.

25. The communication apparatus of claim 20, wherein the master base station is configured to collect information including at least one of a change of a service quality required by the transmission device and the reception device, a change of a service quality provided by the at least one cooperating base station, and a change of a channel state in the network, and switch the network topology based on the collected information.

* * * * *